United States Patent [19]
Brown et al.

[11] Patent Number: 5,553,281
[45] Date of Patent: Sep. 3, 1996

[54] METHOD FOR COMPUTER-ASSISTED MEDIA PROCESSING

[75] Inventors: Alan Brown, Manhattan Beach, Calif.; Terry Timko, Cincinnati, Ohio; Bo Ferger, Burbank, Calif.

[73] Assignee: Visual f/x, Inc., Los Angeles, Calif.

[21] Appl. No.: 330,706

[22] Filed: Oct. 28, 1994

Related U.S. Application Data

[63] Continuation of Ser. No. 216,587, Mar. 21, 1994, abandoned.

[51] Int. Cl.$^6$ .............................. G06F 17/30; G06F 17/50
[52] U.S. Cl. ........................ 395/600; 395/133; 395/147; 395/154; 364/419.07
[58] Field of Search ............... 395/62, 133, 152–161, 395/600, 275, 700, 145, 146, 154, 144; 364/419, 518, 521, 419.07

[56] References Cited

U.S. PATENT DOCUMENTS

| | | | |
|---|---|---|---|
| 4,538,188 | 8/1985 | Barker et al. | 44/318 |
| 4,717,971 | 1/1988 | Sawyer | 358/342 |
| 4,817,050 | 3/1989 | Komatsu et al | 395/600 |
| 4,979,050 | 12/1990 | Westland et al. | 360/4.1 |
| 5,010,478 | 4/1991 | Deran | 395/600 |
| 5,091,849 | 2/1992 | Davis et al. | 395/100 |
| 5,101,364 | 3/1992 | Davenport et al. | 395/152 |
| 5,109,482 | 4/1992 | Bohrman | 395/154 |
| 5,200,993 | 4/1993 | Wheeter et al. | 379/96 |
| 5,226,161 | 7/1993 | Khoyi et al. | 395/650 |
| 5,231,578 | 7/1993 | Levin et al. | 364/419 |
| 5,237,648 | 8/1993 | Mills et al. | 395/133 |
| 5,241,671 | 8/1993 | Reed et al. | 395/600 |
| 5,261,093 | 11/1993 | Asmuth | 395/600 |
| 5,263,167 | 11/1993 | Conner, Jr. et al. | 395/700 |
| 5,267,351 | 11/1993 | Reber et al. | 395/600 |
| 5,278,946 | 1/1994 | Shimada et al. | 395/62 |
| 5,317,508 | 5/1994 | Okamoto et al. | 364/419.01 |
| 5,325,297 | 6/1992 | Bird et al. | 364/419.07 |

OTHER PUBLICATIONS

Sasnett, Russell, "Reconfigurable Video," Optical Information Systems '86, pp. 213–218.

*Primary Examiner*—Thomas G. Black
*Assistant Examiner*—Hosain T. Alam
*Attorney, Agent, or Firm*—Irell & Manella LLP

[57] ABSTRACT

A system for computer-assisted processing of media by an end-user is disclosed. The system preferably includes a relational database management system (RDBMS) containing media content. The RDBMS structure allows users to effectively search an extensive database and identify desired content. At the same time, the adaptive designation of "in-fame" and "out-frame" pointers allows users to efficiently view, modify, annotate, store, and/or distribute to other users only the specific segments of content that are of interest. This highly desirable combination of features reflects the untraditional, open architecture of the system disclosed in accordance with the present invention.

10 Claims, 9 Drawing Sheets

METHOD FOR COMPUTER-ASSISTED MEDIA PROCESSING

RELATE BACK - 35 u.s.c. 120

This is a continuation of application Ser. No. 08/216,587 filed Mar. 21, 1994, now abandoned.

FIELD OF THE INVENTION

The present invention relates to systems for the computer-assisted processing of media content, and particularly to systems for processing media content that is stored and organized in a database management system.

BACKGROUND OF THE INVENTION

Since the 1970's, computers have played increasingly important roles in the processing of media content. For example, computer-based systems have been used for the storage and retrieval of content from image databases; for the on-line editing of stored video clips; and for the electronic modification of digitized images, video, and animation. However, to the best of our knowledge, no system to date has successfully integrated the diverse (and sometimes seemingly incompatible) set of capabilities that would be desirable in an optimal computer-based system for processing full-motion video and animation.

More specifically, the on-line editing products that are currently available on the market, such as Adobe Premiere™, generally lack the sophisticated search and retrieval capability that is necessary where the end-user doing the editing or image processing must select his content from a very large database of possibly unfamiliar video content, such as is often the case for the animation production work like Adobe Premiere™ typically provide only simple file directory mechanism for storing and retrieving content. Such products essentially assume that the end-user is only working with a relatively small collection of source content, is relatively familiar with that content, and does not need any significant assistance in seeking out and identifying the content that is to be edited and processed. As noted, this assumption is problematic with respect to major animation studios. Similarly, products like Adobe Premiere™ generally do not offer the database management capabilities required to maintain data integrity in a multi-user environment, where several users may attempt to concurrently process the same set of content.

On the other hand, U.S. Pat. No. 5,091,849 (Davis, et al.) does disclose a computer-based video production system that includes a distributed database of video content and supports multiple users. However, Davis follows a very traditional relational database management systems ("RDBMS") approach, and therefore organizes and accesses video content strictly in terms of a fixed, hierarchical structure (i,e., production/sequence/scene). The consequence is that an end-user who wishes to process or work with even a small fragment from a particular scene is forced to access and download all data files storing information for that scene. See Davis at column 18, line 25 through column 21, line 45, regarding the acquisition of image data files.

There is a brief discussion in Davis of a "special set of rules" for providing "limited read-write" access to portions of a scene database file that is expected to be concurrently accessed by multiple users (column 12, lines 15–30, and column 24, lines 63–67). However, from the few details provided, it appears that Davis contemplates a mechanism that is not interactive on-the-fly, but that instead requires subdividing predetermined scenes into fixed segments at some point prior to execution time (perhaps by a systems administrator). Thus, while the approach in Davis offers the advantage of database management, it inherently introduces an inflexible storage structure for media content; this rigid structure may cause potentially unacceptable inefficiency and time delay due to the unnecessary communication and processing of media content that is irrelevant to the end-user.

What is needed is a computer-based media processing system that successfully and efficiently incorporates the powerful search capabilities, data integrity, and other benefits of a multi-user RDBMS system, yet simultaneously gives end-users the freedom to interactively organize, structure, and access media content on-the-fly.

SUMMARY OF THE INVENTION

The present invention provides a method for computer-assisted media processing that achieves the aforementioned objective, as well as other advantageous results. The method is applied to a database of stored media content which is organized in portions or "clips" that are indexed by a plurality of attributes (such as keywords or other characteristics).

According to the method, portions of content that are likely to be of interest to the end-user are obtained by specifying a set of desired attribute values, and then searching within the database (using the indices) for content clips whose corresponding attributes match the desired values. A list of these matching clips is displayed to the end-user. In a preferred embodiment, a single, representative key frame from each clip is displayed on-screen in a grid, to help the end-user survey the search results. Preferably, the end-user may also quickly preview a low-resolution version of the matching clips. The end-user then defines selected content by choosing one or more of the listed clips, and by further designating beginning and ending frames ("in" and "out" frames) for specific segments within those chosen clips, for further processing.

The end-user then chooses a particular media processing functions to be performed upon the selected content, and the function is thereupon performed. In a preferred embodiment, the computer processes that actually carry out the desired functions are identified and provided with access to the selected content (in the form of keys) in a manner that is conveniently transparent to the end-user. Preferably, the media processing functions that may be selected by the end-user include playing the selected content on a monitor or similar output device; modifying the selected content; saving a "bookmark" in the form of keys identifying the selected content.

In a further preferred embodiment, the end-user may also select the function of collaborating with at least one other user, by transmitting to the other user an electronic message containing the keys identifying the selected content, and further including verbal instructions for processing tasks to be performed by the other user upon the selected content. A list of the selected content is then displayed for the other user, along with the first user's instructions. The receiving user then surveys the list and selects content for further processing in much the same manner as described in the original, single-user embodiment.

DETAILED DESCRIPTION OF THE INVENTION

A. System Overview

Figure 1:
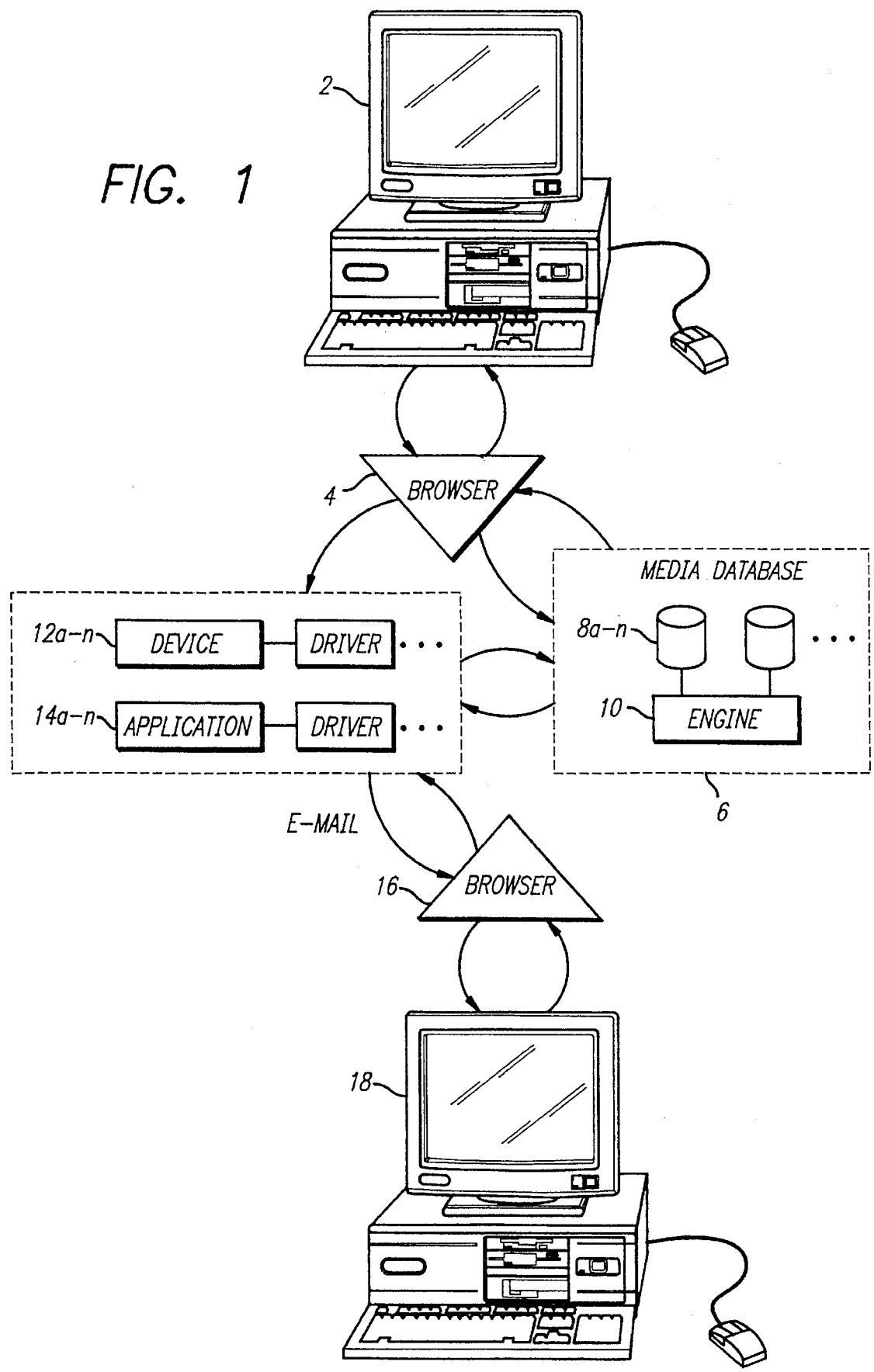
FIG. 1 is a block diagram providing an architectural overview of a computer-based media processing system in accordance with the present invention.

We begin with a broad overview of a computer-based media processing system designed in accordance with the present invention. FIG. 1 is a block diagram providing an architectural overview of such a system. An end-user preferably interacts with the system by means of workstation 2. Preferably, a high performance workstation manufactured by Silicon Graphics, Inc., of Mountain View, Calif., running the IREX variant of the UNIX operating system is used for this purpose, but any other digital processing means supporting a reasonable level of graphical interaction (such as a suitably equipped Apple Macintosh computer) may also be used. As discussed below, workstation 2 preferably executes software creating a graphical user interface that allows the end user to interactively and conveniently survey his choices at any given moment, and input various commands and selections.

The system of FIG. 1 includes a media database 6. The content stored and managed by the database typically includes portions or "clips" of motion picture footage, animation, video, still images, schematics, audio, or other media content. This media content is preferably stored digitally in a plurality of data storage devices 8a–n, which may be physically situated at a plurality of locations (i.e., a distributed environment). Also included in media database 6 and stored in storage devices 8a–n is database management information associated with each portion of content, such as tables or indices of descriptive keywords and other relational attributes, data format specifications, and low-resolution versions of the underlying media content to facilitate previewing of selected content portions by end-users.

Media database 6 also preferably includes a relational database management system engine 10 to allow for the search and retrieval of media content that corresponds to specific keywords or attribute values specified by the end user. The structure and operation of media database 6 and its components is discussed in greater detail below.

The system of FIG. 1 also includes a plurality of hardware devices (such as tape, film, or monitors) for printing or displaying selected media content. As shown in FIG. 1, the devices 12a–n are each associated with driver software that operates to control the device. The system of FIG. 1 similarly includes a plurality of software applications 14a–n for performing image processing, on-line editing, communication between collaborating users (e-mail), or other tasks and functions involved in processing media content. Again, applications 14a–n are preferably associated with and controlled by software drivers.

As depicted in FIG. 1, software represented by browser 4 ties together the various components of the system. For example, browser 4 includes software responsible for running the graphical user interface. Browser 4 allows the user to specify search criteria descriptive of the particular media content that he or she wishes to view or work with, such as specific keywords or other attribute values. Browser 4 also initiates searches based on the end-user's criteria by invoking RDBMS engine 10, and conveys the results of each search to the end-user. Browser 4 allows the user to designate selected media content for further processing, and invokes an appropriate application or device driver (12a–n or 14a–n) to carry out the user's requests, and provides the driver with a key to directly access the selected content in media database 6. Browser 4 is thus connected to practically every aspect of the system.

B. Searching The Database

Figure 2:
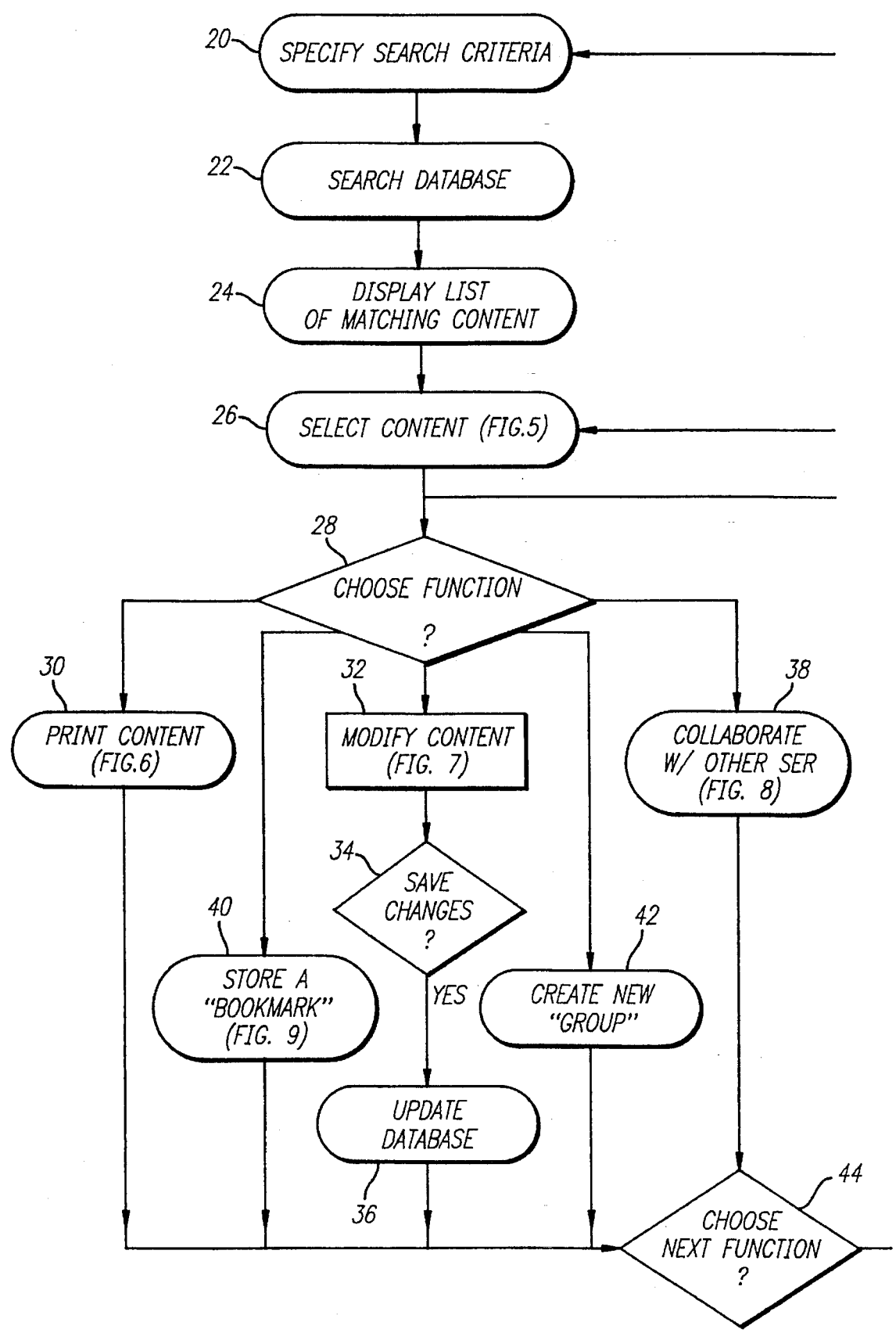
FIG. 2 is a flow diagram illustrating the overall sequence of operations performed in using the media processing system of FIG. 1 to process media content in accordance with the present invention.

Referring to FIG. 2, at step 20, the end-user specifies search criteria descriptive of the particular portions of underlying media content that he or she wishes to view or work with. These criteria may preferably be expressed in terms of descriptive keywords (such as "forest" or "sunset"), common attribute values (such as {background, character, or prop?}), or the like. Table 1 discloses an exemplary set of attributes and other search criteria that we have found to be preferable for these purposes, at least in the context of a system for production of televised animation:

TABLE 1

| Show: ___ | Episode: ___ |
|---|---|
| Scene: ___ | Take: ___ |

{Motion Picture or Television?}
{Short, Opening, Closing, Trailer, Commercial, or Series?}
{Animation or Live Footage?}
{Background, Prop, or Character?}
{Motion or Still?}
Keywords: _____
　　　　　　—

Groups: _____
　　　　　　—

| Executive producer: ___ | Producer: ___ |
|---|---|
| Producer: ___ | Director: ___ |
| Artist: ___ | Creator: ___ |

TABLE 1-continued

| Writer: | —— | FX Supervisor: | —— |
| Worker: | —— | Actor: | —— |

One especially noteworthy aspect of the preferred search criteria is the notion of "groups." As discussed further below, when the end-user has identified a particular collection of media content that he or she would like to be able to collectively reference in the future, the end-user is permitted to enter a group name for the collection. The entered name is then stored on the "group" attribute list for each record corresponding to the selected collection of content. From that point on, the defined group name may be included among search criteria, to identify the particular content so designated. Thus, the group attribute facility effectively allows the end-user to adaptively modify the structure of the database in desired fashion.

Browser 4 preferably controls workstation 2 so as to provide a convenient graphical interface for input by the end-user of the foregoing search criteria; an on-screen form or menu of items to be interactively completed or selected by the end-user works well for this purpose, as will be apparent to those of skill in the art.

At step 22, browser 4 invokes RDBMS engine 10, causing engine 10 to perform a search of media database 6 based on the specified search criteria. RDBMS implementation and operation are well-known in the art. For example, a detailed and comprehensive discussion of RDBMS theory and application is provided in C. J. Date, "An Introduction To Database Systems," Volumes 1 and 2, 4th Edition, Addison Wesley (1986). Therefore, only a brief description of pertinent points is provided herein.

Figure 3:
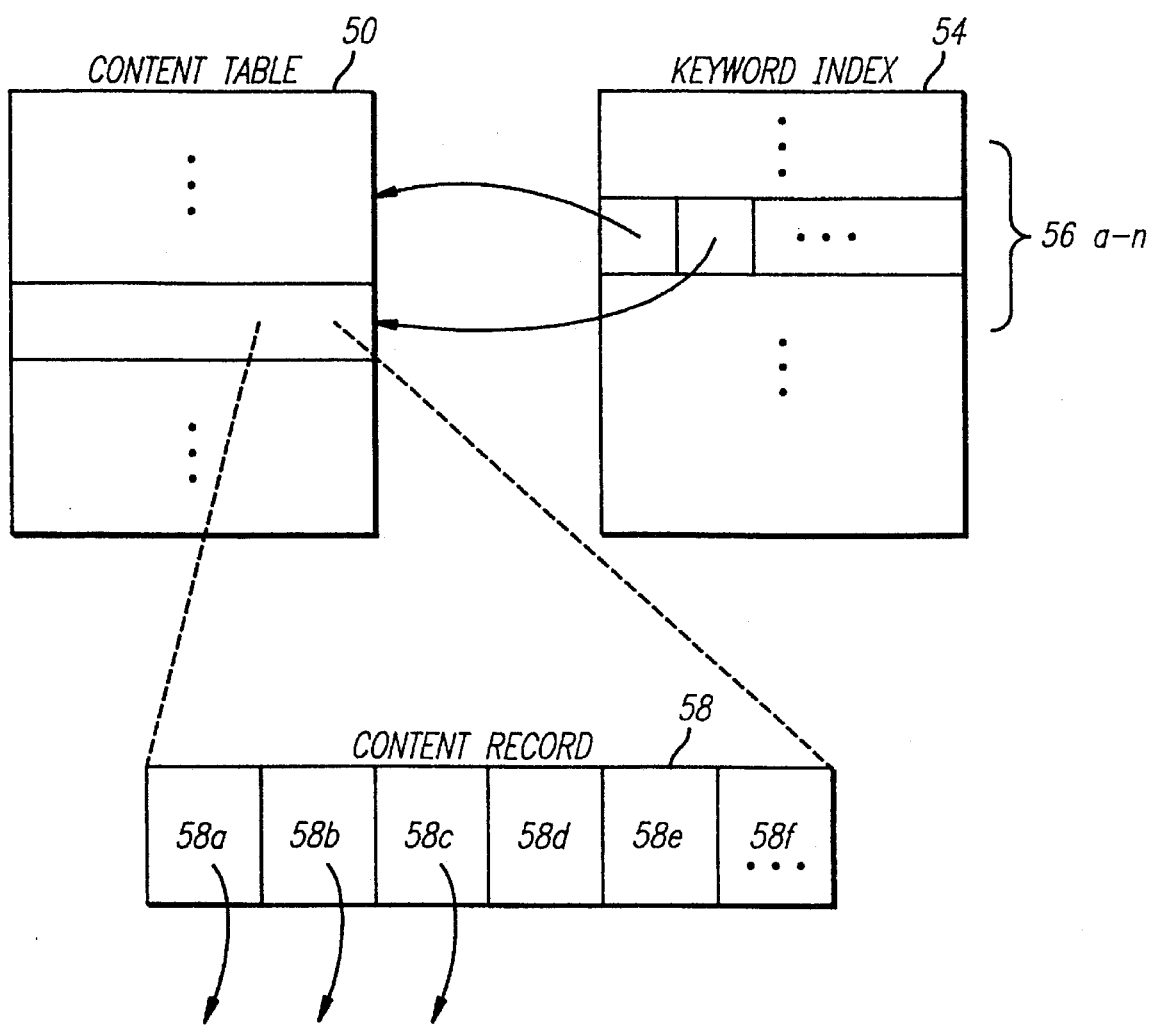
FIG. 3 illustrates key structural aspects of the media database component of the system of FIG. 1, in accordance with the present invention.

As noted briefly above, each clip or portion of content in media database 6 is associated with certain management information such as key words and attribute values. This association is illustrated in FIG. 3. Content Table 50 contains a plurality of content records; the exemplary structure of such records is illustrated in Content Record 58. Content Record 58 contains a plurality of fields: one such field (say, field 58a) contains a "key" or pointer to a portion or clip of content in media database 6 (stored somewhere in devices 8a–n) that is associated with this record; the key preferably incorporates not only the address of the clip, but also any permission information that may be necessary to obtain access to the clip. Another field (say, field 58b) points to a compressed, "preview" version of the clip; digital implementation of such compressed previews is well-known in the art (e.g., using video compression standards such as Apple Quicktimer™). Another field (say, field 58c) points to storage of a representative frame (or "key frame") selected in advance from the clip. The function and purpose of the preview and key frame information will be explained below. Other fields (say, fields 58d, 58e, and possibly others) store or identify the various keywords and other attribute values associated with the corresponding clip.

In addition, an index is created, in the form of a table or B-tree, linking each keyword or attribute value to the specific content records matching that value. For example, Keyword Index 54 is shown in FIG. 3 as containing a plurality of keyword entries 56a–n; each entry contains pointers to all of the content records in Content Table 50 that have a matching keyword. Similar indices are built and stored for each of the various attributes used to index the database. In this way, a "many-to-many" relationship between content and attributes is established. In other words, many different keywords (e.g., "forest") may correspond to a given portion of content, while many portions of content (e.g., various clips which all involve forest settings) may correspond to the same keyword.

The implementation and operation of a relational database using B-tree structures is very well-known in the art. We have found the library of RDBMS B-tree routines and structures licensed by the C-Tree company, Cambridge, Mass. to offer good performance and functionality for these purposes.

An important feature of media database 6 according to the present invention is the clear distinction between management information and underlying content. RDBMS engine 10, for example, deals with management information; underlying content is generally accessed by interested applications directly through keys according to the invention, not through the RDBMS engine. Because of this distinction, certain aspects of the system, such as indexed searching for content based on criteria, focus on management information, and see content only through the structure of Content Table 50 and related indices. Yet, at the same time, other aspects of the system, such as the designation and processing of selected content, access content directly via keys, and can therefore define selected content in a more flexible and adaptive manner—as discussed in the sections that follow.

C. Selection of Content

Figure 4:
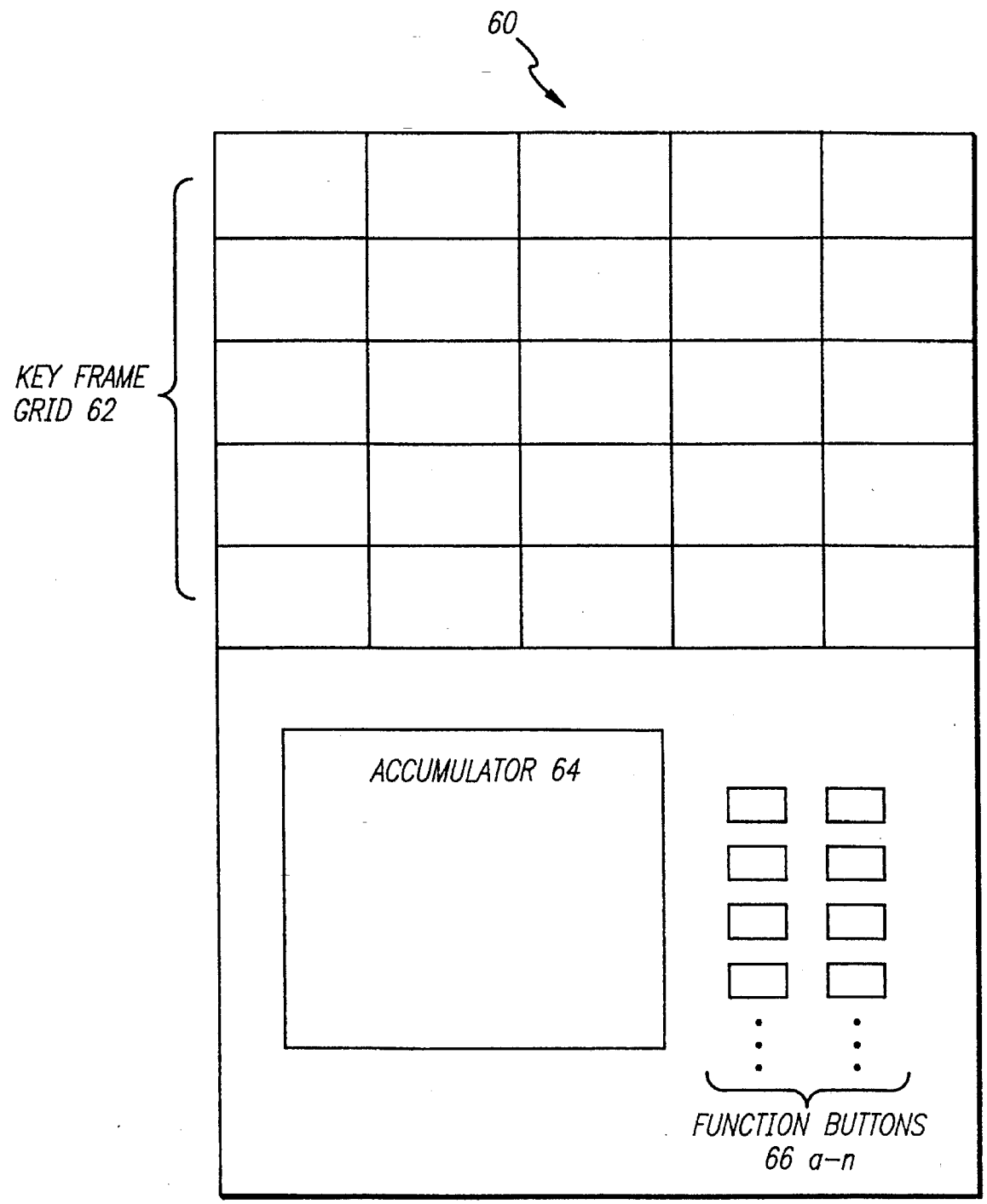
FIG. 4 illustrates a portion of the structure of a preferred graphical user interface for implementing the browser interface that is part of the system of FIG. 1

After the database search has been performed, the results of that search are communicated to the end-user in step 24. Browser 4 controls workstation 2 so as to display a list of the portions of media content that satisfy the user's specified search criteria. FIG. 4 depicts an exemplary graphical user interface screen display 60 for this purpose. Key-frame grid 62 is a rectangular grid; each element of the grid contains a single key-frame chosen to represent a portion of the media content. As noted above, the management information associated with each portion of content in media database 6 includes a predefined key-frame. Thus, each portion of content identified in the search of step 22 is represented at step 24 by the display of a corresponding key-frame within grid 62.

Figure 5:
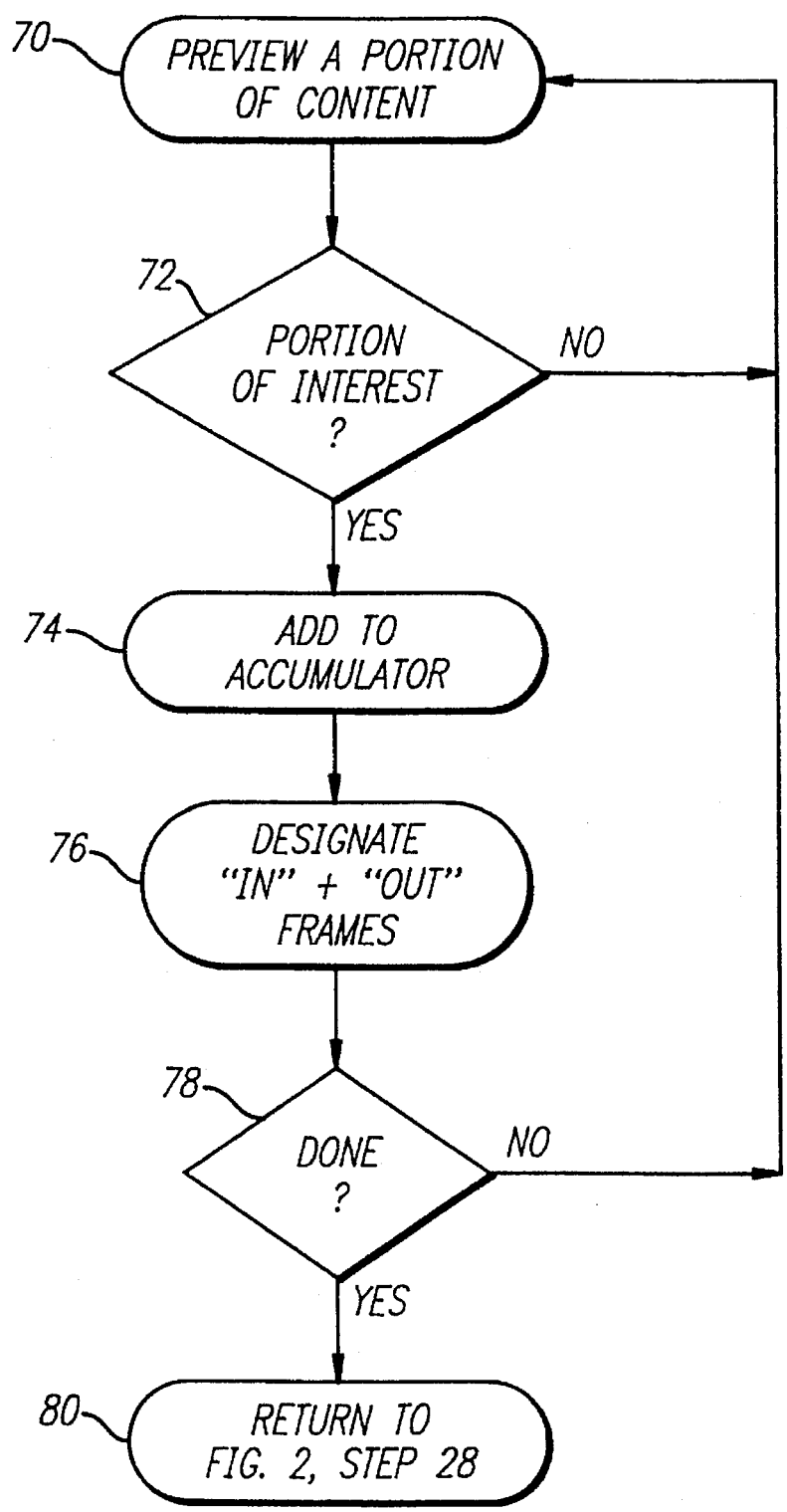
FIG. 5 is a flow diagram illustrating the sequence of operations performed in using the media processing system of FIG. 1 to select specific media content for further processing in accordance with the present invention.

At step 26, the end-user selects the particular media content that he or she wishes to process further. FIG. 4 depicts an exemplary graphical user interface screen display 60 for the selection process, and FIG. 5 describes the process in greater detail. At step 70, the end-user preferably investigates portions of content that may be of interest by previewing such content. This is accomplished by using a mouse or similar interactive pointing device to select any key-frame in grid 62 corresponding to content that the end-user is tentatively interested in pursuing further. In the case of full-motion media, a relatively low-resolution, compressed version of the corresponding media content is then immediately played on-screen in a pop-up window for the end-user. As noted previously, the management information associated with each portion of content preferably includes such a compressed preview version.

Suppose the end-user decides, at step 72, that he or she would like to process some or all of the previewed content further. In that case, at step 74 the end-user again uses a mouse or similar interactive pointing device to point and drag the appropriate key-frame from grid 62 to accumulator 64. Next, at step 76, in an important aspect of the present invention, the end-user designates the specific segment within the previewed content that is to be selected for further processing. More specifically, the end-user identifies the individual starting and ending frames ("in-frame" and "out-frame") of the segment within the chosen clip of content that is of interest. The designation of in and out frames may preferably and conveniently be accomplished as follows. After a chosen clip has been added to the accumulator, and in response to the end-user's command, a preview of the clip is again played on-screen in a pop-up window. However, this time the preview is played more slowly, in "flip-book" fashion, so that the user can click on displayed in-frame and out-frame buttons to interactively identify the beginning and end points of the desired segment of content.

As stated previously, browser 4 is responsible for controlling the graphical user interaction. When the end-user chooses a particular clip and designates an in-frame and out-frame, browser 4 examines the database management information record corresponding to the clip, and formulates and stores the key necessary to address and access that selected segment of content. In this way, the end-user is allowed to adaptively designate any segment of media content that is contained within any item of content included in the list. In other words, the end-user can specify the particular media content that he or she is interested in at a finer level of granularity than is reflected by the fixed structure of the database.

As shown at step 78, the process of selecting content is iterative in nature; the user may select and deposit in accumulator 64 as many portions of content (represented by key-frames in grid 62) as desired for further processing.

D. Processing of Selected Content

At step 28, the end-user chooses a particular function to be performed with the media content that has been selected. Again, browser 4 preferably controls workstation 2 so as to permit the end-user to interactively indicate this choice. Graphical user interface 60 shown in FIG. 4 preferably includes an array of function buttons or icons 66 corresponding to each available processing function; to select a particular function, the user may simply click on the appropriate button or icon. The function chosen by the end-user may typically involve such media production tasks as printing content on an output device (step 30), modifying or editing a particular portion of content (step 32), or collaborating with another end-user (step 38). According to the present invention, the end-user may also create and store an electronic "bookmark" designating a selected segment of content (step 40) for future reference, or may create a new attribute to be associated in database 6 with a group of selected media content so that the selected content may be retrieved in the future as a group (step 42). The details of each such function or task are discussed below, in this section and the subsequent sections.

Figure 6:
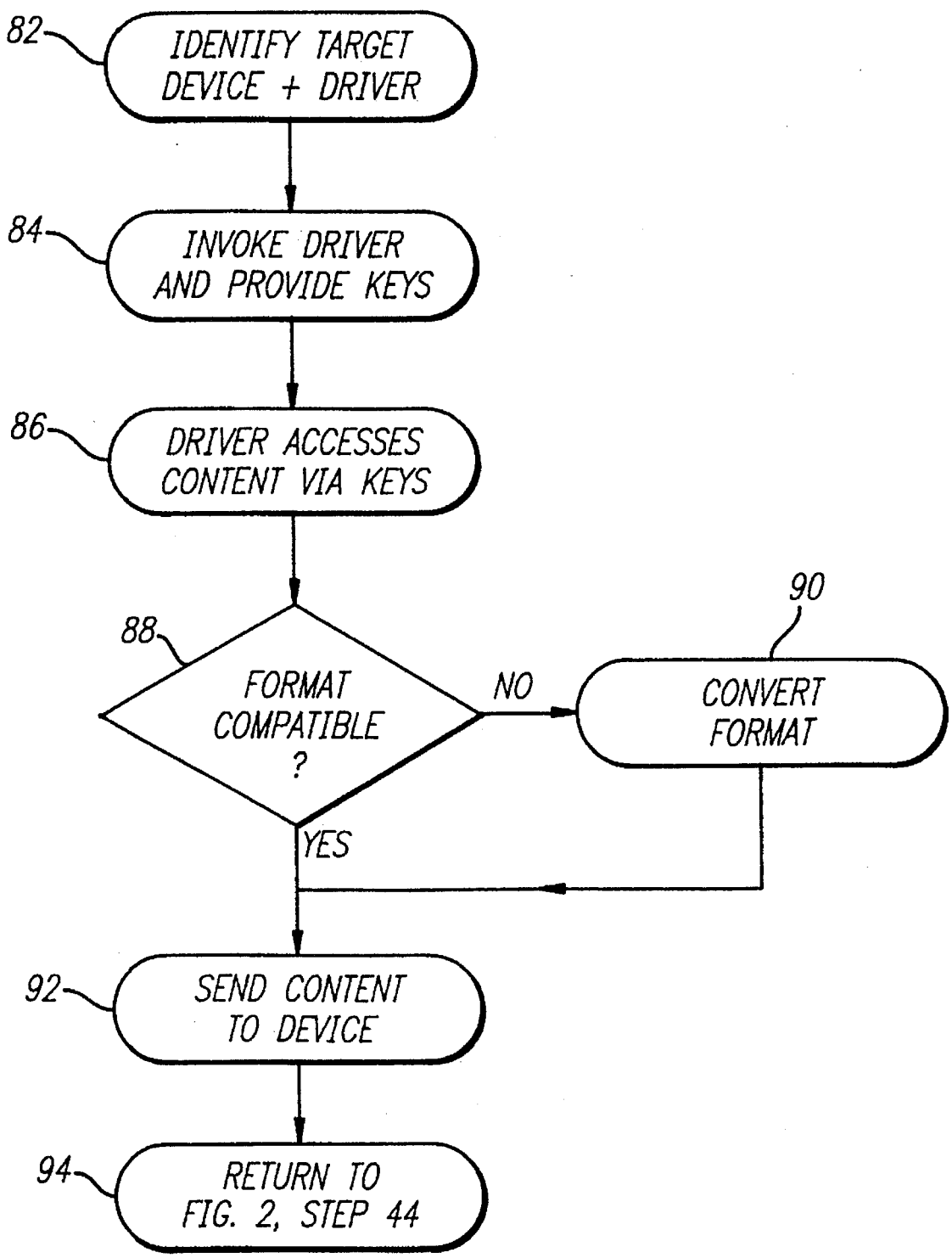
FIG. 6 is a flow diagram illustrating the sequence of operations performed in using the media processing system of FIG. 1 to transfer selected media content to an output device in accordance with the present invention.

FIG. 6 illustrates the carrying out of production tasks involving printing selected content on an output device. At step 82, browser 4 identifies the appropriate hardware device (and associated driver routine) 12 for carrying out the requested function. Next, at step 84, browser 4 invokes the identified driver 12, providing it with keys to access the selected content. Browser 4 also provides the driver with any additional database management information that may be necessary, such as format specifications for the selected content. At step 86, driver 12 uses the keys to access the selected content, for processing by the associated device. If the content is in a data format that is not compatible with target device 12, then at steps 88–90 driver 12 converts the format of the selected content as needed. For this purpose, driver 12 preferably includes Host Independent Image Protocol ("HIIP") interface software licensed by ASDG Incorporated. In any case, at step 92, driver 12 actually sends the selected content to associated device 12, for printing as requested.

Figure 7:
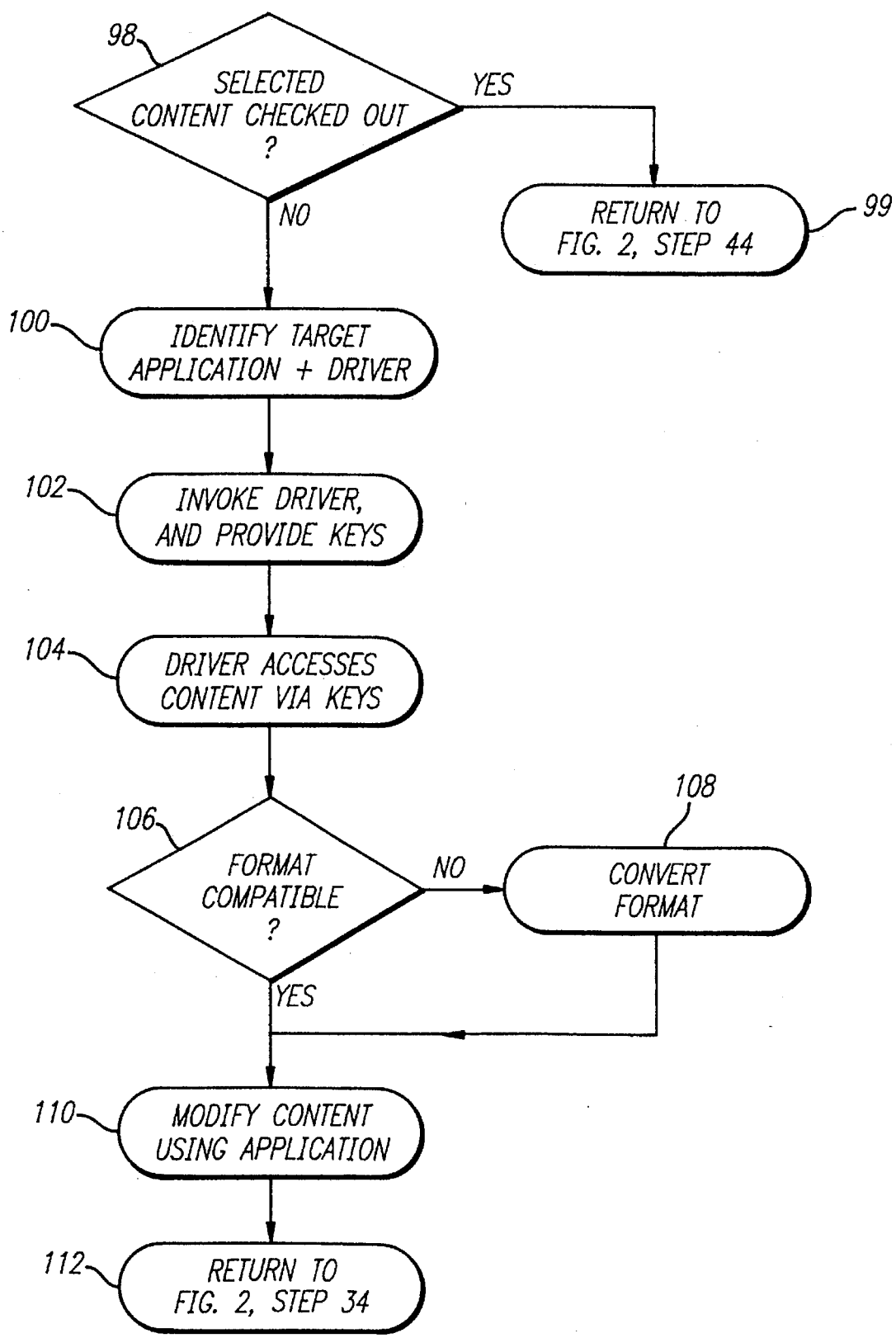
FIG. 7 is a flow diagram illustrating the sequence of operations performed in using the media processing system of FIG. 1 to modify selected media content in accordance with the present invention.

Similarly, FIG. 7 illustrates the carrying out of production tasks such as modifying or editing a particular portion of content according to the principles of the current invention. First, at step 98, browser 4 interrogates RDBMS engine 10 to find out if the selected content has already been "checked out" and is currently being modified by a second user of the system. If the content has been checked out, then our first user cannot be permitted to modify the content at this time, and at step 99 he or she is returned to the choice point of FIG. 2, step 44, to select an alternative course of action. As is well known in the art, this precaution is necessary to avoid corruption of database content. If the selected content is not currently checked out, however, then at step 100, browser 4 identifies the appropriate application program (and associated driver routine) 14 for carrying out the requested function. Next, at step 102, browser 4 invokes the identified driver 14, providing it with keys to access the selected content. Browser 4 also provides the driver with any additional database management information that may be necessary, such as format specifications for the selected content.

Note that browser 4 does not itself actually access the underlying content. This eliminates any redundant copying or transmission of content data to or from browser 4; browser 4 can work entirely in terms of keys and management information, which improves efficiency greatly. At step 104, driver 14 uses the keys to access the selected content, for processing by the associated application. By accessing content directly by means of keys, instead of requesting content through RDBMS engine 10, driver 14 can access the precise segment of content needed (i.e., as defined in part by the in-frames and out-frames selected by the end-user), as reflected in the key, rather than automatically accessing the entire clip as organized in the database.

Once again, if the selected content is in a data format that is not compatible with target application 14, then at steps 106–108 driver 14 converts the format of the selected content as needed, as discussed above with regard to FIG. 6. In any case, at step 110 driver 14 actually invokes associated application 14, which modifies the content as requested. Typically, application 14 will itself be an interactive program (such as a "paint" utility, or an on-line editing tool), and so the end-user will directly control the processing performed at step 110. After the desired modifications are complete, the end-user is preferably given the opportunity, at step 34 in FIG. 2, to decide whether or not to permanently save the content as modified. If the end-user does elect to save the modifications, then step 36 updates database 6 appropriately. This update should include an opportunity for the end-user to modify the keyword or other attribute values associated with the modified content, since the modifications may have directly changed some of those attributes. Browser 4 preferably controls this interaction, again by providing a suitable, on-screen, interactive menu or form.

E. Collaboration (E-mail)

Figure 8:
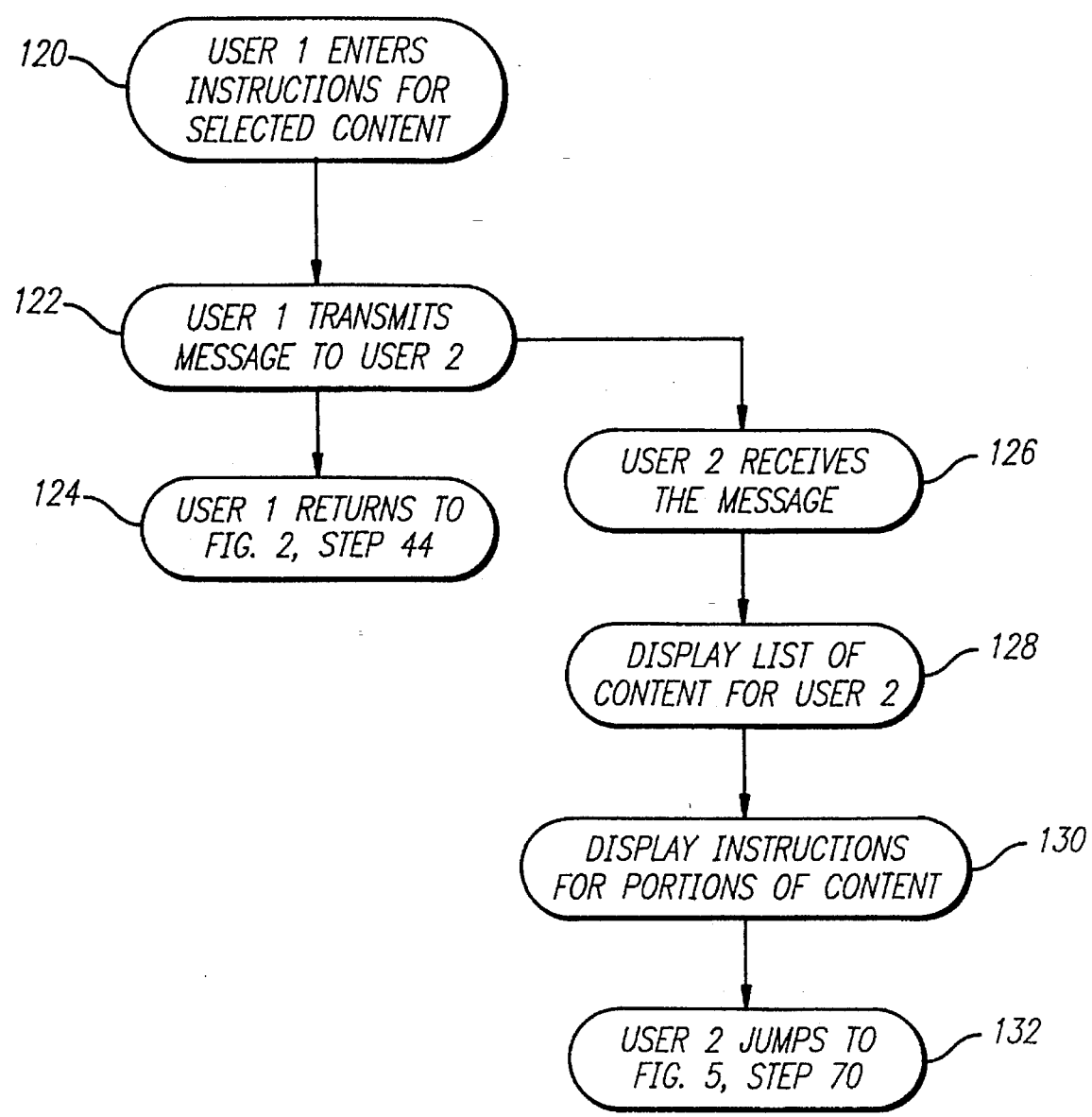
FIG. 8 is a flow diagram illustrating the sequence of operations performed in using the media processing system of FIG. 1 to electronically transmit annotated, selected media content between two or more collaborating users in accordance with the present invention.

In a preferred embodiment of the invention, a given end-user may collaborate with one or more other users in processing the contents of media database 6 (step 38). The details of this technique are now explained with reference to FIG. 8. At step 120, browser 4 controls workstation 2 to enable first end-user ("user1") to input textual instructions corresponding to each portion of selected content, and intended for a second end-user ("user2"). At step 122, browser 4 (preferably using the underlying operating system electronic mail routines) transmits an electronic message ("e-mail") to user2; the message contains pointers to the management information and keys associated with each portion of selected content defined by user1, and also contains user1's textual instructions for each portion of selected content. After sending the message, user1 can then proceed to other work (step 124).

Meanwhile, at step 126, browser 16 (associated with user2 and workstation 18) notifies user2 that he or she has been sent an e-mail, and user2 elects to receive the e-mail. At step 128, browser 16 controls workstation 18 so as to display a list of the selected content identified in the e-mail message. Preferably, this display is provided by browser 16 in the same fashion as the display of search results described earlier in connection with FIG. 4: i.e., using the grid of key frames. Under control of user2 (preferably using a mouse to point and click on key frames of interest), user1's instructions for each portion of content are also displayed. At that point, user2 can proceed to select and process specific content in the same fashion described earlier for the single-user embodiment: i.e., at step 132, user2 selects specific content to be processed according to the steps of FIG. 5, and then continues on at step 28 of FIG. 2.

In this way, user1 and user2 can conveniently and efficiently collaborate by exchanging information and instructions that are highly specific to particular portions of content that are of joint interest.

F. Reference Functions

Figure 9:
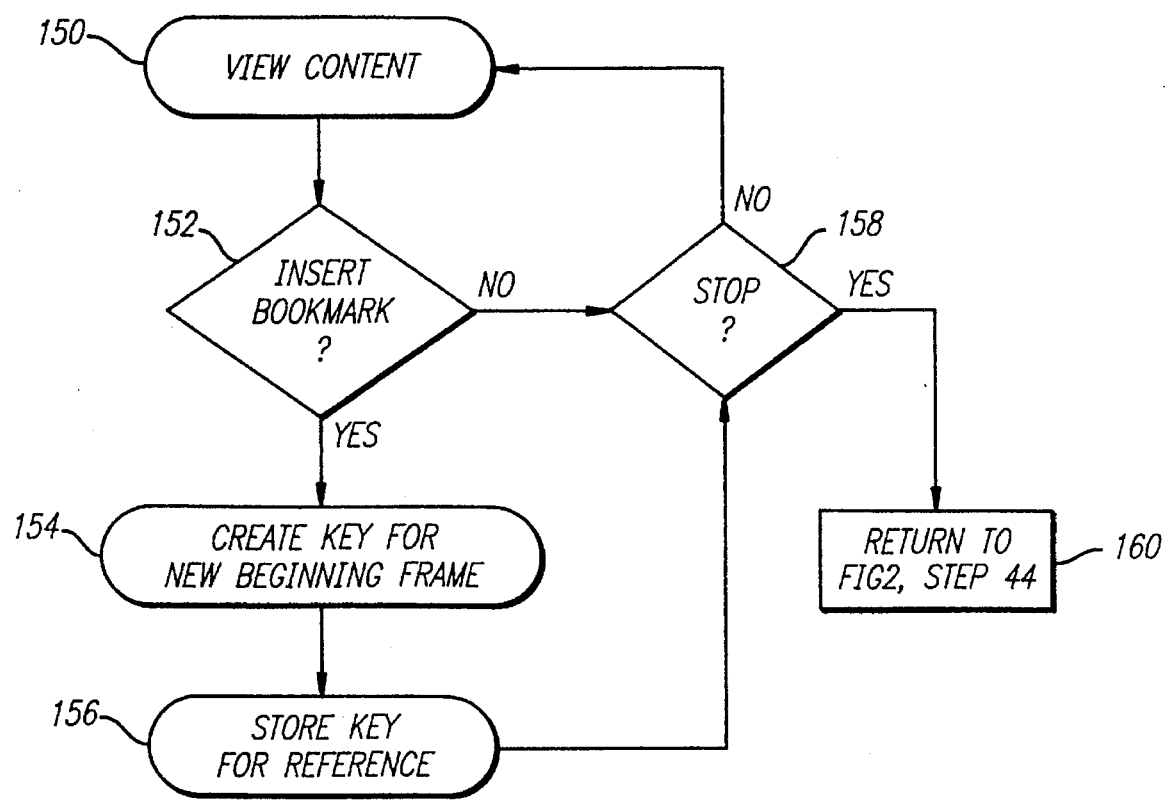
FIG. 9 is a flow chart illustrating an "electronic bookmark" application of the present invention.

Another application of the present invention is that an end-user may preferably define and store an electronic "bookmark" designating a selected segment of content (step 40) for future reference. The details of this technique are now explained with reference to FIG. 9. If this function is chosen, then at step 150, browser 4 controls workstation 18 (or a separate monitor) to play the selected content for the end-user. As shown in decision step 152, the end-user may continue viewing as long as desired. If the end-user desires to mark a particular point in the media content (e.g., so that the end-user may temporarily stop viewing the current content and resume viewing later on at the same point, or for other reference purposes), he or she may elect to insert an electronic bookmark. In that case, at step 154, browser 4 creates a modified key for the content being viewed, with a new beginning frame corresponding to the position in the content that the end-user wishes to mark. Browser 4 stores the key, at step 156, for future reference by the end-user. As shown in step 158, the end-user may then preferably elect to either stop viewing the current content—in which case, the system returns to the main choice point of FIG. 2, step 44—or to continue further.

One special function that may be requested by the end-user with respect to selected content is the "group" function, which creates a new attribute to be permanently associated in the database with the selected content. The group function corresponds to step 49, and is a relatively straightforward step: if the end-user selects the "group" function button, then browser 4 controls workstation 2 so as to graphically prompt the end-user for a group name, which could preferably be any text string. The database "group" index (i.e., the table or tree for groups) is then updated to contain the newly created group item, and pointers to the selected content in that group. In this way, selected content may conveniently and efficiently be retrieved in the future by the end-user as a group, simply by specifying the new group name as part of the end-user's search criteria.

G. Iteration

It is envisioned that the system will be used in an iterative manner. Thus, as shown in FIG. 2, after a particular chosen task has been performed, the end-user may decide at step 44 whether to perform additional processing functions with the selected content (i.e., return to step 28), whether to select different media content for processing (i.e., return to step 26), or whether to define and commence a new search (i.e., return to step 20).

The invention has been described in an exemplary and preferred manner, but is not limited thereto. Those skilled in the art will recognize that a number of modifications and improvements can be made to various aspects of the invention without departure from the essential spirit and scope. The scope of the invention is limited only as described in the following claims:

We claim:

1. A method for computer-assisted media processing by an end-user, for use with a database of stored media content, said content being indexed by a plurality of attributes, said method comprising the steps of:

specifying, under control of said end-user, a set of desired values for one or more of said attributes;

searching within said database for one or more matching portions of media content corresponding to said set of desired attribute values, each of said portions comprising a plurality of frames;

displaying, to said end-user, a list identifying said matching portions of media content;

after said step of displaying a list identifying said matching portions of media content, designating, tinder control of said end-user, one or more of said matching portions of media content;

after said step of designating one or more of said matching portions of media content, further designating, under control of said end-user, one or more beginning frames and one or more ending frames for said one or more designated portions of media content, thereby defining selected media content;

requesting, under control of said end-user, one or more media processing functions to be performed upon said selected media content;

performing said media processing functions upon said selected media content.

2. The method of claim 1, wherein said step of displaying a list identifying said matching portions of media content further includes the step of previewing, under control of said end-user, a relatively low-resolution version of one or more of said matching portions of media content.

3. The method of claim 1, wherein said step of displaying a list identifying particular portions of media content further includes the step of displaying, for each one of said particular portions of media content, a single key frame of media content taken from said portion.

4. The method of claim 1, wherein said step of performing said media processing functions further includes the following steps:

identifying, in a manner that is transparent to said end-user, one or more computer processes for performing said media processing functions; and providing, in a manner that is transparent to said end-user, said computer processes with one or more pointers identifying said selected media content by address.

5. The method of claim 1, wherein said step of performing one or more media processing functions includes providing said selected media content to a media output device.

6. The method of claim 1, wherein said step of performing one or more media processing functions includes modifying said selected media content.

7. The method of claim 6 further including the step of updating said database to reflect said modifying of said selected media content.

8. The method of claim 1, wherein said step of performing one or more media processing functions includes storing one or more pointers identifying said selected media content.

9. The method of claim 1, wherein said step of performing one or more media processing functions further includes the following steps:

transmitting an electronic message from said first end-user to at least one collaborating end-user, said message identifying said selected media content, said message further including one or more instructions for processing tasks to be performed by said collaborating end-user upon said selected media content;

displaying, under control of said collaborating end-user, a list identifying said selected media content; and displaying, under control of said collaborating end-user, said one or more instructions.

10. The method of claim 1, further including the following steps:

specifying, under control of said end-user, one or more new attributes to be associated with said selected media content;

updating, in a manner transparent to said end-user, said database to include said new attributes.

* * * * *